Jan. 8, 1929.
C. L. ERICKSON
1,698,432
ORIFICE MIXER
Filed Jan. 8, 1926
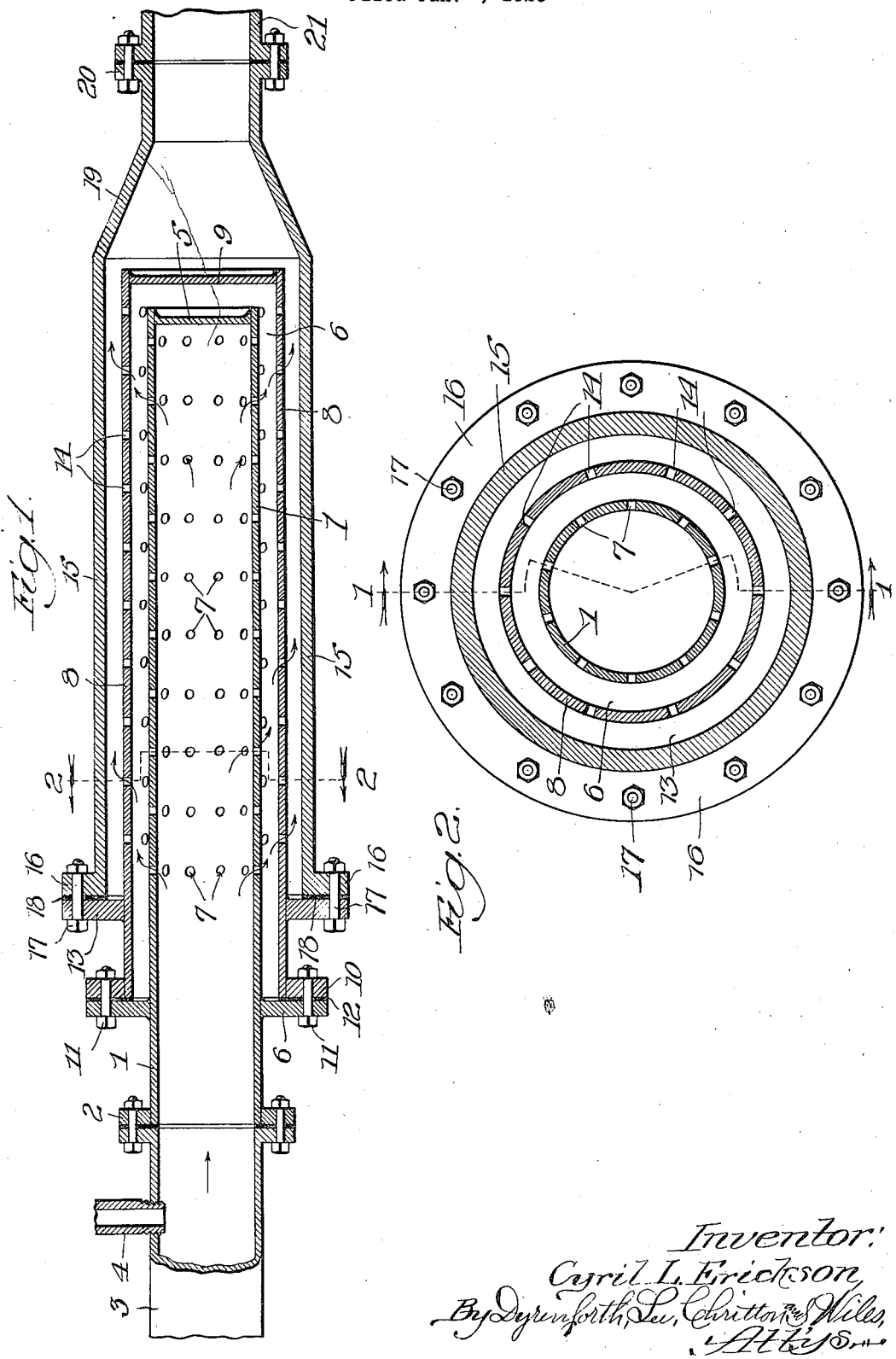
Inventor:
Cyril L. Erickson Patented Jan. 8, 1929.

1,698,432

UNITED STATES PATENT OFFICE.

CYRIL L. ERICKSON, OF WHITING, INDIANA, ASSIGNOR TO STANDARD OIL COMPANY, OF WHITING, INDIANA, A CORPORATION OF INDIANA.

ORIFICE MIXER.

Application filed January 8, 1926. Serial No. 80,024.

This invention relates to orifice mixers, and particularly to orifice mixers suitable for effecting thorough mixing or intermingling of immiscible liquids. The improved mixer is particularly suitable for use in petroleum refining operations, in which it is necessary to treat the oil with relatively small amounts of non-miscible reagents such as sulphuric acid, water, alkalis, sodium plumbite solution and the like.

The invention will readily be understood from the following description of a preferred embodiment which is illustrated in the accompanying drawing in which:

Figure 1 is a longitudinal section of the apparatus, on the broken line 1—1 of Fig. 2; and Fig. 2 is a transverse section on the broken line 2—2 of Fig. 1.

In the embodiment shown in the drawing, 1 is a pipe provided with an outer flange 2 for connection with a liquid supply line, for example, an oil supply pipe 3. An immiscible reagent may be supplied to the oil by the pipe 4 or in other suitable manner. The other end of the pipe 1 is closed by a plate 5. Adjacent the flange 2, a flange 6 is attached to the pipe 1 by welding or in other suitable manner. Between the closed end 5 and the flange 6, the walls of the pipe 1 are provided with a large number of orifices 7. Arranged around pipe 1 and in spaced relation thereto is a second pipe 8 having a closed end 9 and a flange 10 at its other end which is removably attached to the flange 6, for example, by bolts 11, a suitable gasket 12 being interposed between the two flanges. Adjacent the flange 10, the pipe 8 is provided with a flange 13 attached to pipe 8, for example, by welding, and between the end 9 and flange 13, the pipe 8 is provided with a large number of orifices 14. Arranged about the pipe 8 and in spaced relation thereto is located an outer casing 15, provided at one end with a flange 16 which is removably attached to the flange 13, for example, by bolts 17, a suitable gasket 18 being interposed between the flanges. Beyond the pipe 8, the outer casing 15 is preferably reduced or tapered as at 19 and the reduced end provided with a flange 20. The flange 20 may be connected with a pipe 21. The flanges 2 and 20 are preferably standard pipe flanges so that the mixer may be inserted with ease in a line conveying the liquids to be mixed. The orifices 7 and 14 in the pipes 1 and 8 are preferably arranged in a plurality of rings of orifices, the rings of orifices of the pipe 1 being staggered longitudinally of the mixer with respect to the rings of orifices of the pipe 8, as will readily be understood from Fig. 1, while the individual orifices 14 are preferably staggered circumferentially of the pipe 8 with respect to the individual orifices 7 of the pipe 1, as will readily be understood from Fig. 2, so that the flow of the liquids from the orifices 7 to the orifices 14 combines longitudinal and circumferential flow.

While I have shown two perforated pipes 1 and 8, it is to be understood that a greater number may be used if desired.

The operation of the mixer is as follows: The liquids to be mixed are supplied to pipe 1 from pipe 3, and flow through the orifices 7 into the annular space between pipes 1 and 8, from whence they pass through the orifices 14 into the annular space between pipe 8 and outer cover 15 and thence through the tapering portion 19 thereof to a pipe 21 leading to a settling tank or other suitable receiving device. The mixer will operate equally well if the flow is reversed, that is, the liquids to be mixed may be introduced into the pipe 21 and may be supplied to pipe 3, if desired. Such operation is, however, not preferred. The passage through the orifices 7 and 14, the tortuous path of the liquids and the turbulent flow thereof through the apparatus result in thorough intermingling of the liquids and where a liquid such as oil is being treated with a relatively small quantity of immiscible reagents such as sulphuric acid, water or the like, said reagent is broken up into minute globules so that its action on the oil or the like is rendered more uniform and effective.

The improved mixer possesses the valuable characteristic that it can easily be taken apart and cleaned. By removing bolts 11 and 17 the closed pipes 1 and 8 and outer casing 15 are separated and may be easily cleaned both within and without. In operating in the preferred manner, with the flow in the direction indicated by the arrow in Fig. 1, the device does not accumulate deposition of sludge, and is substantially self cleaning.

While I have described one preferred embodiment of the invention, it is to be understood that I am not limited thereto, since various modifications may readily be made therein, within the scope of the appended claims.

I claim:

1. A liquid mixer comprising a plurality of perforated tubes of different sizes, a flange at the end of each tube, and another flange near the end of each tube, means uniting a flange at the end of one tube with the flange near the end of another so that the latter tube lies substantially within the former, an outer casing provided with liquid conduit means and means uniting said outer casing with the flange near the end of the outermost tube so as to substantially enclose said outermost tube in said casing.

2. A liquid mixer comprising a tube provided with a flange and closed at an end, said tube being provided with a large number of orifices between said flange and closed end, a larger tube provided with a flange at one end and with a flange near said end and closed at the other end and provided with a large number of orifices between said closed end and the flange near the open end, removable means for connecting the flange at the end of the second tube with the flange of the first tube so that the second tube encloses the first tube in spaced relation, an outer casing and removable means connecting the other flange of the second tube to the outer casing.

3. A liquid mixer comprising a plurality of perforated tubes of different sizes, a flange at the end of each tube, a flange near the end of each tube larger than the flange at the end of the tube, and bolts uniting a flange at the end of one tube with the flange near the end of another so that the latter tube lies substantially within the former.

4. A liquid mixer comprising a plurality of perforated tubes of different sizes, a flange at the end of each tube, a flange near the end of each tube larger than the flange at the end of the tube, bolts uniting a flange at the end of one tube with the flange near the end of another so that the latter tube lies substantially within the former, an outer casing provided with liquid conduit means, and bolts uniting said outer casing with the flange near the end of the outermost tube so as to substantially enclose said outermost tube in said casing.

CYRIL L. ERICKSON.